(No Model.)
S. E. BAUDER.
DEVICE FOR GROOMING ANIMALS.
No. 377,420. Patented Feb. 7, 1888.
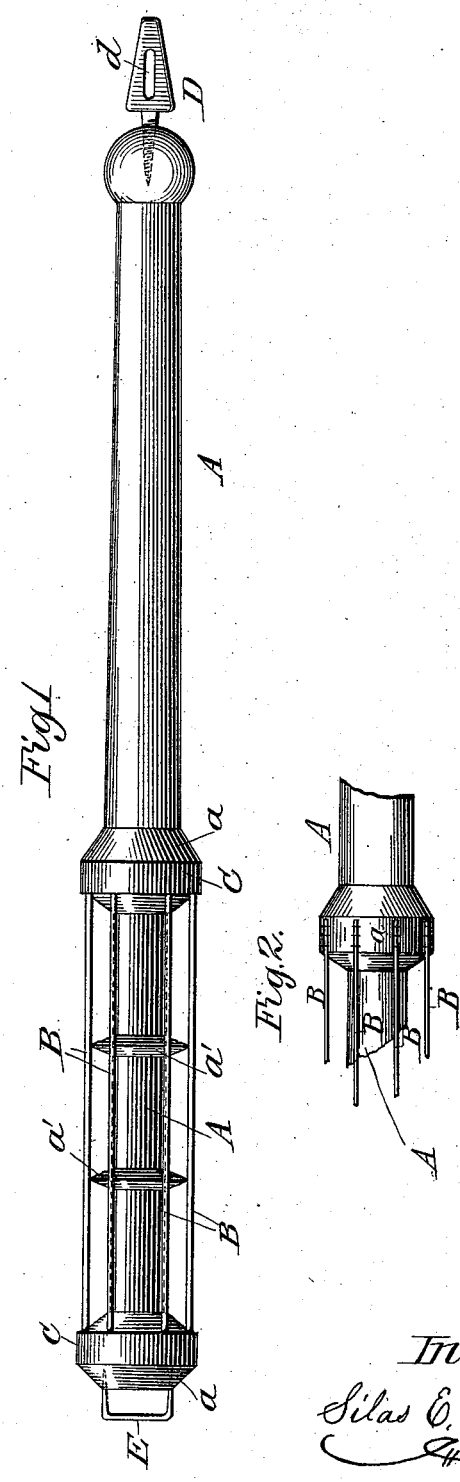
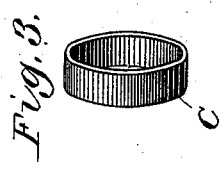
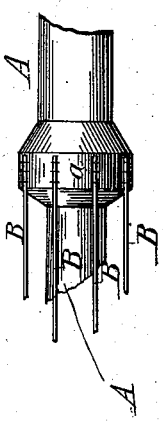
Witnesses:
John F. McCrystal.
Lewis N. Werner.
Inventor:
Silas E. Bauder,

UNITED STATES PATENT OFFICE.

SILAS E. BAUDER, OF SANDUSKY, OHIO.

DEVICE FOR GROOMING ANIMALS.

SPECIFICATION forming part of Letters Patent No. 377,420, dated February 7, 1888.

Application filed October 5, 1887. Serial No. 251,555. (No model.)

*To all whom it may concern:*

Be it known that I, SILAS E. BAUDER, of the city of Sandusky, in the county of Erie and State of Ohio, have invented a new and useful Device for Grooming Animals; and I do declare that the following is a full, clear, and exact description of the construction and operation of the same, reference being had to the annexed drawings, making a part of this specification, and to the letters and figures of reference marked thereon.

Figure 1 of the drawings is a representation of a perspective of my grooming-stick. Fig. 2 of the drawings represents a wide-face end band, showing the ends of the longitudinal wires fastened thereto by means of staples and tacks or their equivalent; and Fig. 3 represents a ferrule adapted to be driven over the wide-face end bands and the ends of the longitudinal wires.

Similar letters refer to similar parts throughout the several views.

My invention relates to a device for currying and cleaning the skin and hair of horses and other animals, and is adapted to remove the old hair, dried sweat, and other foreign substances from the skin of such animals quickly without scratching or otherwise injuring the skin of the animal so groomed, and, owing to the length of the handle, the loosened hair and dirt are not apt to lodge on the clothing of the operator, the construction rendering it self-cleaning, or nearly so.

Other features will be hereinafter referred to and explained.

The invention consists of a handle having bands or astragals turned on the upper or head end thereof, the two end bands being greater in face width than the intermediate ones. A series of longitudinal wires are secured to the bands by staples or tacks, or equivalent device, parallel with each other, a distance apart around the circumference of said bands. Ferrules are driven over the ends of the wires and the wide-faced end bands, and an iron spud having a slot in its center is screwed into the lower end of the handle for the purpose of cleaning the shoes and the feet of the animal, and the slot is of service when a cloth is passed to its middle portion through it to dust the animal with. A wide staple is driven into the upper end of said handle for grooming purposes and to hang the device up by when not in use.

Referring to the drawings, A represents the handle having wide-faced end bands or astragals, *a*, and narrow-faced intermediate bands or astragals, *a'*, turned on the upper or head end thereof; B, the longitudinal wires properly secured to said bands or astragals; C, ferrules over the ends of the wires and the wide-faced end bands or astragals; D, an iron spud having slot *d* screwed into the lower end of the handle, and E a wide staple driven a distance into the upper end of said handle.

Having thus fully described my invention, what I claim, and desire to secure by Letters Patent of the United States, is—

1. As a new article of manufacture, the grooming-stick described, consisting of a handle having wide-faced end bands and narrow-faced intermediate bands turned on the upper or head end thereof, and a series of wires secured to said wide-faced end bands and resting upon said narrow-faced intermediate bands, running lengthwise with said handle parallel with each other a distance apart entirely around the circumference of said bands, substantially as and for the purpose herein set forth.

2. As a new article of manufacture, the grooming-stick described, consisting of a handle having a number of bands or astragals turned on one end thereof and an iron spud screwed into the opposite end, a series of longitudinal wires secured to said bands or astragals at intervals around the circumference thereof, and ferrules encircling both the end bands or astragals and the ends of said longitudinal wires, substantially as herein described.

3. As a new article of manufacture, the grooming-stick described, consisting of the handle A, having bands or astragals *a a'*, longitudinal wires B, ferrules C, spud D, having slot *d*, and staple E, constructed, arranged, and operating as and for the purposes set forth.

In testimony that I claim the above I have hereunto subscribed my name in the presence of two witnesses.

SILAS E. BAUDER.

Witnesses:
LEWIS N. WERNER,
JNO. F. MCCRYSTAL.